Oct. 20, 1931.  J. W. LEGG  1,828,328

PHOTOGRAPHIC DEVICE

Original Filed Jan. 25, 1922

WITNESSES:
A. J. Schiefelbein
F. H. Miller

INVENTOR
Joseph W. Legg.
BY
Wesley G. Carr
ATTORNEY

Patented Oct. 20, 1931

1,828,328

UNITED STATES PATENT OFFICE

JOSEPH W. LEGG, OF WILKINSBURG, PENNSYLVANIA, ASSIGNOR TO WESTINGHOUSE ELECTRIC & MANUFACTURING COMPANY, A CORPORATION OF PENNSYLVANIA

PHOTOGRAPHIC DEVICE

Application filed January 25, 1922, Serial No. 531,549. Renewed February 6, 1930.

My invention relates to photographic devices or instruments and particularly to devices for permitting a study of electric arc and other light phenomena.

One object of my invention is to provide a device of the above indicated character that shall permit the production of simultaneous records of the current and voltage characteristics in-phase with the luminuous and other characteristics of momentary and continued arcs, incandescent lights and other light-giving elements.

Another object of my invention is to provide a combination oscillograph and photographic device that shall be simple and durable in construction and effective in operation.

Heretofore, it has been usual to effect records of the current and voltage, of a circuit to be tested, by means of a moving photographic film in a device, such as the well known oscillograph. Also, in the study of electric arcs and other light-giving elements, it has been usual to photograph the same from different positions and under different conditions in order to determine the characteristics thereof, but to the best of my knowledge, there has been no device which has combined the current and voltage curves with a photographic curve of the arc or light in time phase therewith on the same record sheet.

In practicing my invention, I provide a device similar to a usual oscillograph by which records of the current and voltage of a circuit may be effected but also by which, and in time phase with the current and voltage records, any one of various records of an electric arc or other light-giving elements may be effected.

Figure 1:
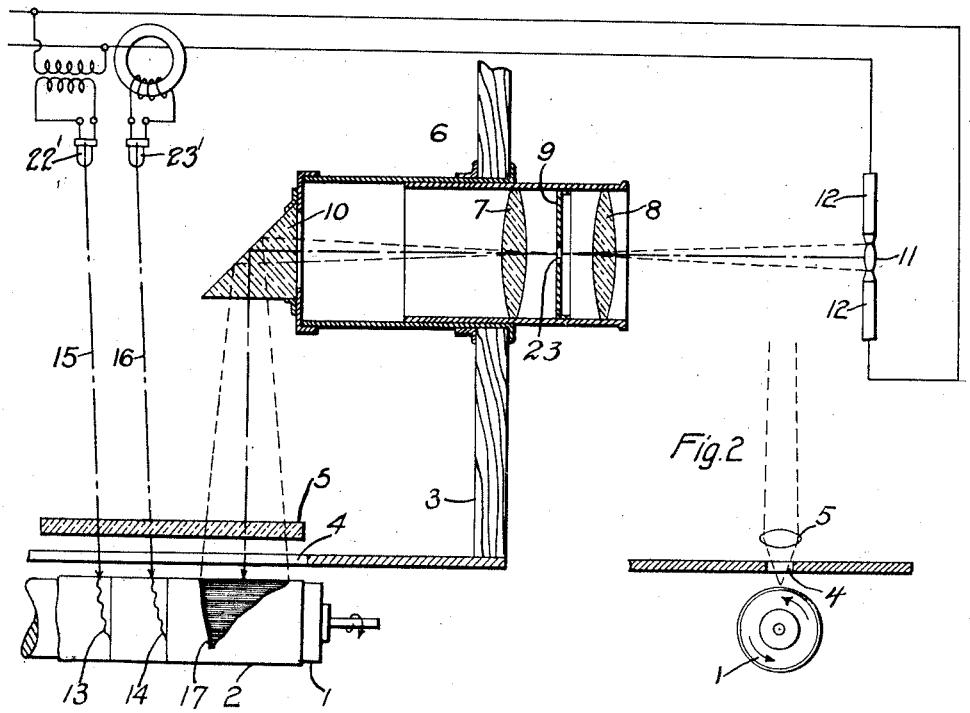
Figure 2:
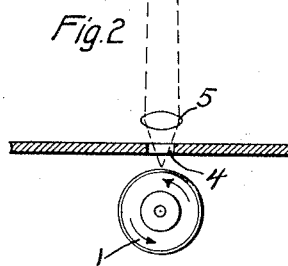
Figure 3:
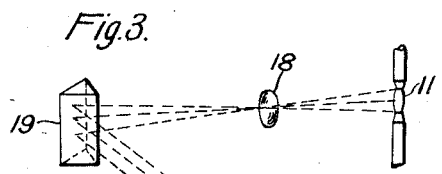
Figure 4:
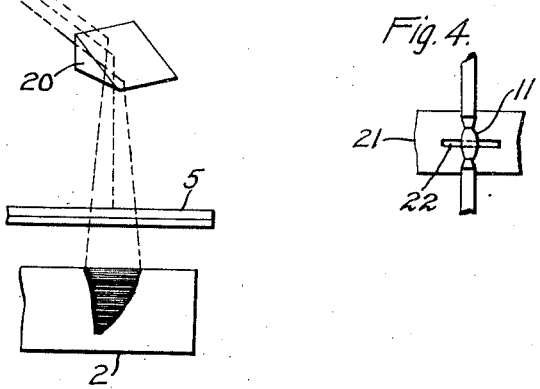

Figure 1 of the accompanying drawings is a fragmentary semi-diagrammatic sectional view of a device embodying my invention, as seen from above, Fig. 2 is a view of a portion of the device shown in Fig. 1, taken at right angles thereto, Fig. 3 is a diagrammatic view of a modified form of my invention, and Fig. 4 is a detail view of a shield or templet that may be used in connection with a device constructed according to my invention.

My invention comprises, in general, a rotatable drum 1 upon or over which a photographic film 2 is adapted to be moved, a supporting structure 3 having a slot 4 therein, a cylindrical lens 5 disposed opposite the slot 4 and a photographic device 6 comprising lenses 7 and 8, an iris diaphragm 9, having an opening 23 therethrough, and a prism 10 for reflecting images of an arc 11 that extends between electrodes 12.

As in the ordinary oscillograph, photographic records 13 and 14 of the voltage and current of a circuit to be measured may be transmitted by light rays from galvanometers 22' and 23' along lines 15 and 16 through the lens 5 and the slot 4, to the film 2.

By my invention, a photographic record, indicated by the shaded area 17 on the film 2, may be made by light transmitted from the arc 11 through the device 6 and, by means of the prism 10, projected through the lens 5 and the slot 4, in time phase with the voltage and current records 13 and 14. With the arc 11 in a horizontal position, as shown in Fig. 1, the record produced on the film 2 will be proportional to the length and intensity of the arc. With the electrodes in a vertical position, the record would be proportional to the varying width and intensity of the arc.

When the electrodes are in the vertical position, during the making of a record of the width of the arc, any predetermined portion thereof may be studied by interposing a templet 21 having a slot 22 therein, such as is shown in Figure 4, between the arc and the lens-system.

In the event that it is inconvenient to change the electrodes from the horizontal to the vertical position, or vice versa, in the manner just described, the effect of rotating the electrodes may be secured by optical means, as indicated in Figure 3, through the addition of another reflecting prism to the system shown in Figure 1 and the alteration of the angle of the reflecting surface of the prism shown in the said figure.

Referring specifically to Figure 3, the alternative form of my invention comprises a lens 18, a prism 19 that corresponds, except for the angular position of the reflecting face thereof, to the prism 10, a second prism 20 for throwing the beam forward through the cylindrical lens 5, and a supporting device for the film 2.

In operation, the device may be utilized to study the characteristics of steady or continuous arcs or other light-emitting elements or to determine the characteristics of the same during changing light values, such as those occurring when a pair of electrodes are separated to break an arc.

While the device is primarily intended for the study of arcs, it is equally well adapted for the study of circuit-interrupter flashes, incandescent lamps and other light-giving elements.

While I have shown and described particular forms of my invention, changes may be effected therein without departing from the spirit and scope thereof, as set forth in the appended claims.

What I claim as my invention is:

1. The combination with an oscillograph for co-operation with a light-sensitive element for recording the voltage impressed upon, and the current traversing, a plurality of electrodes and an arc therebetween adapted to be broken by the separation of the electrodes, of means for causing a record to be produced on the element showing instantaneous linear dimensions of the arc in phase with corresponding instantaneous values of the voltage and the current records on the element.

2. In a system for recording characteristics of an electrical arc located between a plurality of electrodes and adapted to be broken by the separation of the electrodes, a movable light-sensitive element, means for recording on said element characteristics of an electrical quantity supplied to said arc, and means for causing a record to be produced on said element showing instantaneous linear dimensions of said arc in phase with said instantaneous values.

3. In a recording system, a light source the dimensions of which may be varied, a movable light-sensitive element, and means for causing a record to be produced on said element showing instantaneous linear dimensions of said light source.

4. In a recording system, a light source the dimensions of which may be varied, a movable light-sensitive element and means including a cylindrical lens for causing a record to be produced on said element showing instantaneous linear dimensions of said light source.

5. In a recording system, a source of light, a movable photo-sensitive element, a cylindrical lens disposed adjacent said element, the axis of said lens being transverse to the direction of movement of said element and lying in a plane substantially parallel to the surface thereof, and means including a reflecting surface for causing light from said source to pass through said cylindrical lens and impinge upon the surface of said element, said reflecting surface being disposed substantially perpendicular to a plane determined by the axis of said cylindrical lens and the projection of said axis on said element, changes in the angle at which the light from said source encounters said reflecting surface being represented by an exposed area on the sensitive element which varies proportionally to said changes in a direction transverse to the movement of said element.

6. In a recording system, a source of light, a movable light-sensitive element, a lens for focusing on said element the light from said source to a line of light which is transverse to the direction of movement of said element, said lens having a major axis, and means including a reflecting surface for causing light from said source to pass through said lens and impinge upon the surface of said element, said reflecting surface being disposed substantially perpendicular to a plane determined by said major axis and the projection of said axis on said element, changes in the angle at which the light from said source encounters said reflecting surface being represented by an exposed area on the sensitive element which varies proportionally to said changes in a direction transverse to the movement of said element.

7. In a recording system, a source of light, a movable light-sensitive element, a lens for projecting a narrow line of light upon said element, the axis of said lens being transverse to the direction of movement of said element and lying in a plane substantially parallel to the surface thereof, and means including a reflecting surface for causing light from said source to pass through said lens and impinge upon the surface of said element, said reflecting surface being disposed substantially perpendicular to a plane determined by the axis of said lens and the projection of said axis on said element, changes in the angle at which the light from said source encounters said reflecting surface being represented by an exposed area on the sensitive element which varies proportionally to said changes in a direction transverse to the movement of said element.

In testimony whereof, I have hereunto subscribed my name this 10th day of January, 1922.

JOSEPH W. LEGG.